United States Patent
Ganesh et al.

(10) Patent No.: US 9,953,286 B2
(45) Date of Patent: Apr. 24, 2018

(54) SHIPPING PREFERENCES POPULATION SYSTEMS AND RELATED METHODS

(71) Applicant: United Parcel Service of America, Inc., Atlanta, GA (US)

(72) Inventors: Bala Ganesh, Alpharetta, GA (US); Scott Castaldo, Woodstock, GA (US); Amber Sappington, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 816 days.

(21) Appl. No.: 14/195,418

(22) Filed: Mar. 3, 2014

(65) Prior Publication Data

US 2014/0258164 A1   Sep. 11, 2014

Related U.S. Application Data

(60) Provisional application No. 61/773,445, filed on Mar. 6, 2013.

(51) Int. Cl.
| | |
|---|---|
| *G06Q 40/00* | (2012.01) |
| *G06Q 10/08* | (2012.01) |
| G06F 17/30 | (2006.01) |
| G06Q 30/06 | (2012.01) |
| G06F 17/24 | (2006.01) |

(52) U.S. Cl.
CPC ......... *G06Q 10/083* (2013.01); *G06F 17/243* (2013.01); *G06F 17/30899* (2013.01); *G06Q 30/0601* (2013.01)

(58) Field of Classification Search
CPC .............. G06Q 30/0601; G06F 17/243; G06F 17/30899
See application file for complete search history.

(56) References Cited

U.S. PATENT DOCUMENTS

| | | |
|---|---|---|
| 2002/0153409 A1 | 10/2002 | Yu |
| 2003/0217018 A1 | 11/2003 | Groff et al. |
| 2005/0137991 A1 | 6/2005 | Bruce et al. |

(Continued)

OTHER PUBLICATIONS

International Search Report from PCT application No. PCT/US2014/030540 dated Dec. 23, 2014.

(Continued)

*Primary Examiner* — Scott S Trotter
(74) *Attorney, Agent, or Firm* — Shook, Hardy & Bacon L.L.P.

(57) ABSTRACT

The present systems and methods describe a computer system that collects user shipping preferences, including, for example, the shipping speeds (e.g., standard three to five day shipping) a user selects on various retailer websites. The system is configured to determine the one or more preferred shipping methods for the user based on the collected shipping preferences and to save the preferred shipping methods to memory (e.g., the user commonly prefers standard shipping). When the user visits an online retailer, the system, detects a shipping field (e.g., where the user may select or input a shipping preference), accesses the saved preferred shipping method (e.g., the user prefers standard shipping), and populates the shipping field with the saved preferred shipping method (e.g., the system automatically selects "standard shipping" for the user).

27 Claims, 3 Drawing Sheets

(56) References Cited

U.S. PATENT DOCUMENTS

| | | |
|---|---|---|
| 2005/0257148 A1* | 11/2005 | Goodman ............. G06F 17/243 715/226 |
| 2005/0278231 A1 | 12/2005 | Teeter |
| 2008/0066020 A1 | 3/2008 | Boss et al. |
| 2010/0125494 A1 | 5/2010 | Boss et al. |
| 2010/0185476 A1 | 7/2010 | Eager |
| 2010/0306185 A1 | 12/2010 | Smith et al. |
| 2010/0332284 A1 | 12/2010 | Hillbush et al. |
| 2011/0071954 A1* | 3/2011 | McCall .................. G06Q 10/08 705/337 |
| 2011/0113073 A1 | 5/2011 | Chang |
| 2012/0047440 A1 | 2/2012 | Kaye |
| 2012/0131446 A1 | 5/2012 | Park |
| 2013/0325737 A1* | 12/2013 | Smalling .............. G06Q 10/083 705/330 |
| 2014/0316991 A1* | 10/2014 | Moshal ............. G06F 17/30879 705/64 |

OTHER PUBLICATIONS

International Search Report from PCT application No. PCT/US2014/20219 dated Sep. 4, 2014.
Final Office Action dated Feb. 17, 2017 in U.S. Appl. No. 14/215,409, 24 pages.

* cited by examiner

SHIPPING PREFERENCES POPULATION SYSTEMS AND RELATED METHODS

CLAIM OF PRIORITY

This application claims the benefit of priority under 35 U.S.C. § 119(e) to the filing date of U.S. Provisional Patent Application No. 61/773,445 filed Mar. 6, 2013, entitled, "Shipping Preferences Population Systems and Related Methods," which is incorporated herein by reference in its entirety.

BACKGROUND

Shoppers frequently fill out web forms when making purchases from online retailers. These web forms usually include a variety of selectable shipping options, which may be substantially similar for each online checkout process. Selecting the same shipping options at each checkout can be tedious and perceived as a waste of time to the consumer.

Various embodiments of the present systems and methods recognize and address the foregoing considerations.

SUMMARY

A computer system, comprising at least one processor, in various embodiments, is configured for: 1) collecting one or more shipping preferences associated with a user; 2) determining a preferred method of shipping for the user based at least in part on the collected shipping preferences; 3) detecting one or more shipping fields on a webpage accessed by the user; and 4) populating the one or more shipping fields with the preferred method of shipping.

According to various embodiments, a computer system, comprising at least one processor, is configured for: 1) detecting a first shipping options set displayed on a first retailer website, wherein the first shipping options set comprises one or more selectable first shipping options; 2) detecting which one or more selectable first shipping options a user has selected from the first shipping options set; 3) storing the detected one or more selectable first shipping options the user has selected in memory; 4) detecting a second shipping options set on a second retailer website, wherein the second shipping options set comprises one or more selectable second shipping options; and 5) selecting, at least partially based on the stored the detected one or more selectable first shipping options, one or more selectable second shipping options.

A computer system comprising at least one processor, according to particular embodiments, is configured for: 1) detecting a plurality of sets of shipping options displayed to a user on a plurality of retailer websites, wherein the plurality of sets of shipping options comprise a plurality of selectable shipping preferences; 2) collecting a predetermined number of the plurality of selectable shipping preferences selected by the user; 3) determining the preferred method of shipping of the user, wherein determining the preferred method of shipping comprises determining the one or more shipping preferences of the plurality of selectable shipping preferences most frequently selected by the user from the predetermined number of selectable shipping preferences; and 4) saving the preferred method of shipping to memory.

A computer system comprising at least one processor, according to various embodiments, is configured for: 1) collecting one or more shipping preferences associated with a user; 2) determining a preferred method of shipping for the user based at least in part on the collected one or more shipping preferences; 3) transmitting the preferred method of shipping to an online retailer; wherein the online retailer populates a shipping field with the preferred method of shipping, the shipping field being associated with an order of the user on a website associated with the online retailer.

BRIEF DESCRIPTION OF THE DRAWINGS

Reference will now be made to the accompanying drawings, which are not necessarily drawn to scale, and wherein.

DETAILED DESCRIPTION OF VARIOUS EMBODIMENTS

Various embodiments will be described more fully hereinafter with reference to the accompanying drawings. It should be understood that the invention may be embodied in many different forms and should not be construed as limited to the embodiments set forth herein. Like numbers refer to like elements throughout.

System Overview

A computer system, according to various embodiments, is configured to substantially automatically (e.g., automatically) select a user's preferred shipping method (e.g., Two Day Shipping, Next Day Air, Standard Shipping, etc.) and/or preferred carrier (e.g., UPS®) on a retail shopping website. In a particular embodiment, the system is configured to: (1) collect one or more shipping preferences (e.g., preferred shipping method, such as Next Day Air) associated with a user; (2) determine a preferred method of shipping (e.g., Next Day Air) for the user based at least in part on the collected shipping preferences; (3) detect a shipping field on a webpage (e.g., one or more fields for selecting or filling in shipping preferences); and (4) populate the shipping filed by selecting the preferred method of shipping (e.g., selecting Next Day Air).

In various embodiments, the system is configured to collect the user's shipping preferences when the user is checking out on various retailer websites. In a particular example, the system is configured to detect when a user has selected one or more particular shipping options (e.g., Next Day Air) while checking out from an online retailer (e.g., Amazon®). Continuing with this example, the system is configured to then collect the user's one or more selections (e.g., Next Day Air) and to store the user's one or more selections in memory.

According to particular embodiments, continuing with the above example, the system is configured to detect one or more shipping fields on another retailer website (although it could be the same online retailer's website) accessed by the user. The system is configured to, in this example, fill out the one or more shipping fields according to the stored one or more user shipping preferences (e.g., the system is configured to select Next Day Air).

The computer system may provide the above functionality through any suitable mechanism. The computer system may be embodied as a browser plug-in/add-on, a social network application, stand-alone software, a web-application, and/or a mobile application. In various embodiments, the computer system may be provided by a logistics company or any other suitable company that can access consumer data. Additionally, the computer system may be rendered on a user's computing device (laptop computer, desktop computer, mobile device, etc.), on a company's servers, a social network server, a third party server (e.g., a retailer's server), or any combination of one or more devices and servers.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized, including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

Figure 1:
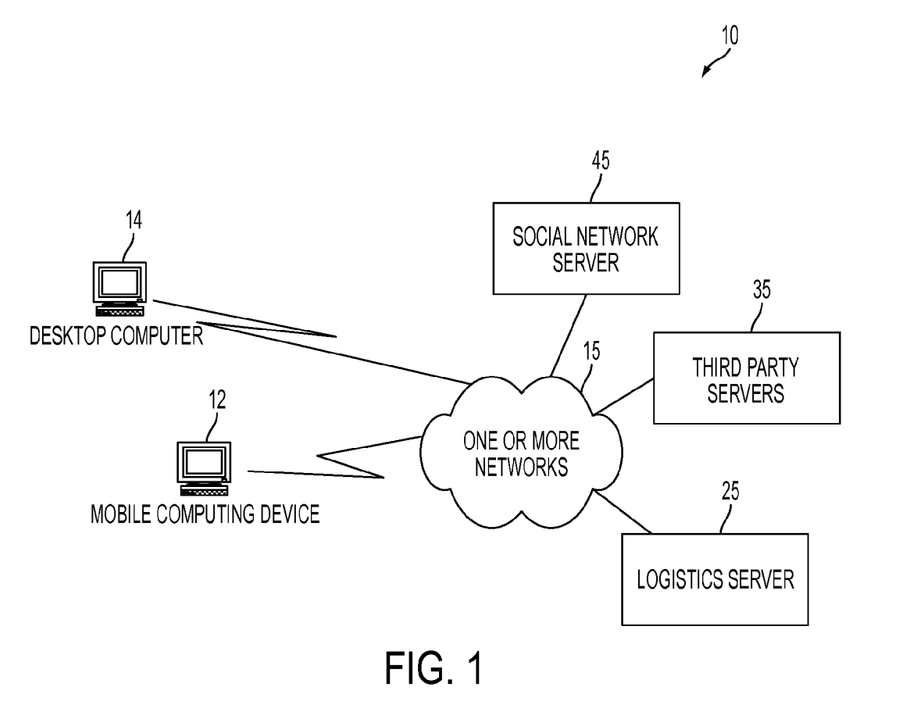
FIG. 1 is a block diagram of a Shipping Preferences Population System according to one embodiment.

FIG. 1 shows a block diagram of a Shipping Preferences Population System 10 according to a particular embodiment of the present invention. As may be understood from this figure, the Shipping Preferences Population System 10 may include one or more Networks 15, a Logistics Server 25, one or more Third Party Servers 35 (e.g., a web hosting server, retailer's server, any other server that hosts websites), a Social Network Server 45 (e.g., a sever associated with any service that allows users to make connections and/or to publically or privately share data, pictures, videos, or information) and one or more of the following: a Mobile Computing Device 12 (e.g., a handheld computing device, a laptop computer, a smart phone, a tablet computer, or any other mobile computing device) or a Desktop Computer 14.

The one or more Networks 15 facilitate communication between the Mobile Computing Device 12, Desktop Computer 14, Logistics Server 25, one or more Third Party Servers 35, and Social Network Server 45. These one or more Networks 15 may include any of a variety of types of computer networks such as the Internet, a private intranet, a public switch telephone network (PSTN), WAN, LAN, or any other type of suitable network. In certain variations of the embodiment shown in FIG. 1, both the communication link between the Mobile Computing Device 12, Desktop Computer 14, Logistics Server 25, one or more Third Party Servers 35, and Social Network Server 45 are implemented via the Internet using Internet Protocol (IP). The communication link between the Logistics Server 25, one or more Third Party Servers 35, and Social Network Server 45 may be, for example, implemented via a LAN or WAN.

It should be understood that the Servers 25, 35, and 45 do not necessarily need to be deployed over the network. For example, in various embodiments, any or all of Severs 25, 35, and 45 may be deployed locally on the user's computer, tablet, and/or mobile device.

Figure 2:
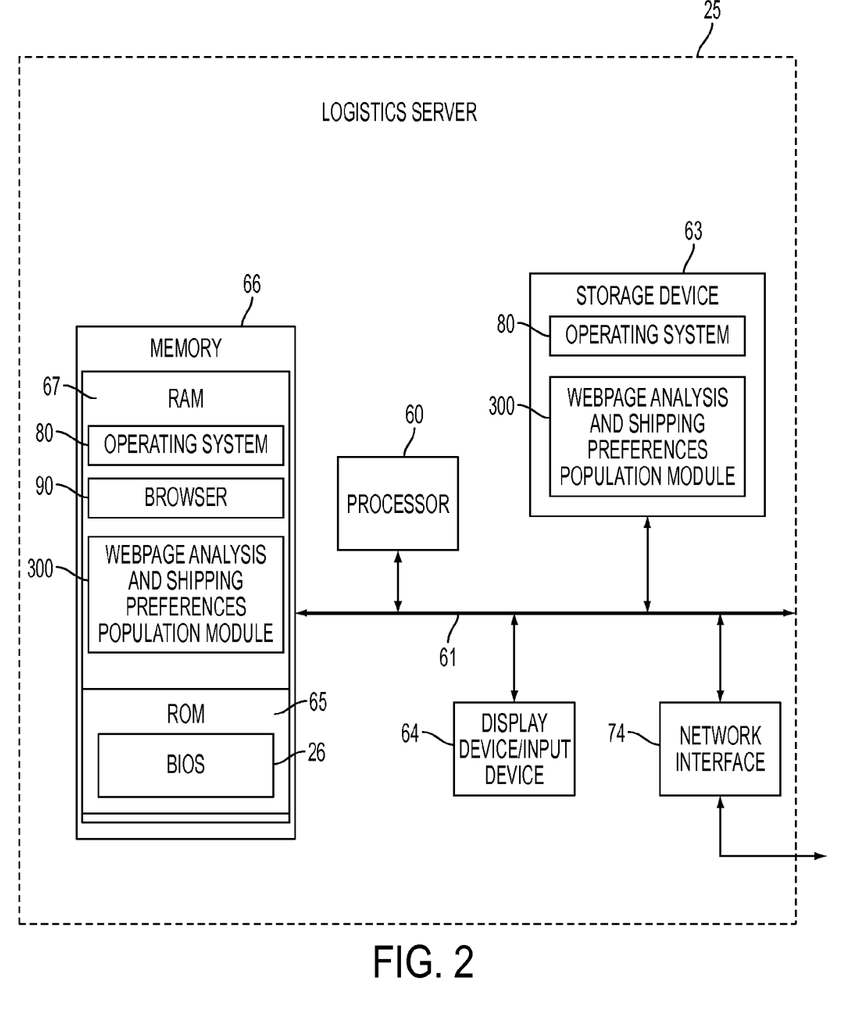
FIG. 2 is a block diagram of an Exemplary Logistics Server of FIG. 1.

FIG. 2 shows a block diagram of an exemplary embodiment of an exemplary Logistics Server 25 that is configured for executing a Webpage Analysis and Shipping Preferences Population Module 300. It should be understood based on this disclosure that any suitable computers (e.g., any of the computing devices shown in FIG. 1) may be used to execute this module and that various steps executed by the module may be executed on different computers.

The Logistics Server 25 may include several basic computer hardware components. As may be understood from FIG. 2, in this embodiment, the Logistics Server 25 includes a Processor 60 that communicates with other elements within the Logistics Server 25 via a System Interface or Bus 61. The Logistics Server 25 also includes a Display Device/ Input Device 64 for receiving and displaying data. This Display Device/Input Device 64 may be, for example, a keyboard, voice recognition, or pointing device that is used in combination with a monitor. The Logistics Server 25 further includes a Memory 66, which preferably includes both a Read Only Memory (ROM) 65 and a Random Access Memory (RAM) 67. The server's ROM 65 may be used to store a Basic Input/Output System (BIOS) 26 that contains the basic routines that help to transfer information between elements within the Logistics Server 25.

Also located within the Logistics Server 25 is a Network Interface 74 for interfacing and communicating with other elements of a computer network. It will be appreciated by one of ordinary skill in the art that one or more components of the Logistics Server 25 may be located geographically remote from other components of the Logistics Server 25 and/or that certain components may be omitted from particular embodiments. Furthermore, one or more of the components may be combined, and additional components performing functions described herein may be included in the Logistics Server 25.

The Logistics Server 25 may also include at least one Storage Device 63, such as a hard disk drive, a floppy disk drive, a CD Rom drive, or an optical disk drive, for storing information on various computer-readable media, such as a hard disk, a removable magnetic disk, or a CD-ROM disk. As will be appreciated by one of ordinary skill in the art, each of these Storage Devices 63 may be connected to the Bus 61 by an appropriate interface. The Storage Devices 63 and their associated computer-readable media may provide nonvolatile storage for the Logistics Server 25. It should be noted that the computer-readable media described above could be replaced by any other type of computer-readable media known in the art. Such media includes, for example, magnetic cassettes, flash memory cards, and digital video disks.

A number of program modules may be stored by the various storage devices and/or within the RAM 67. Such program modules include an Operating System 80 and a Webpage Analysis and Shipping Preferences Population Module 300. For simplicity and brevity, these modules are merely exemplary and may represent a number of program modules which control certain aspects of the operation of the Logistics Server 25 with the assistance of the Processor 60 and the Operating System 80. Exemplary embodiments of the Webpage Analysis and Shipping Preferences Population Module 300 are described in more detail below.

Exemplary Webpage Analysis and Shipping Preferences Population Module

Figure 3:
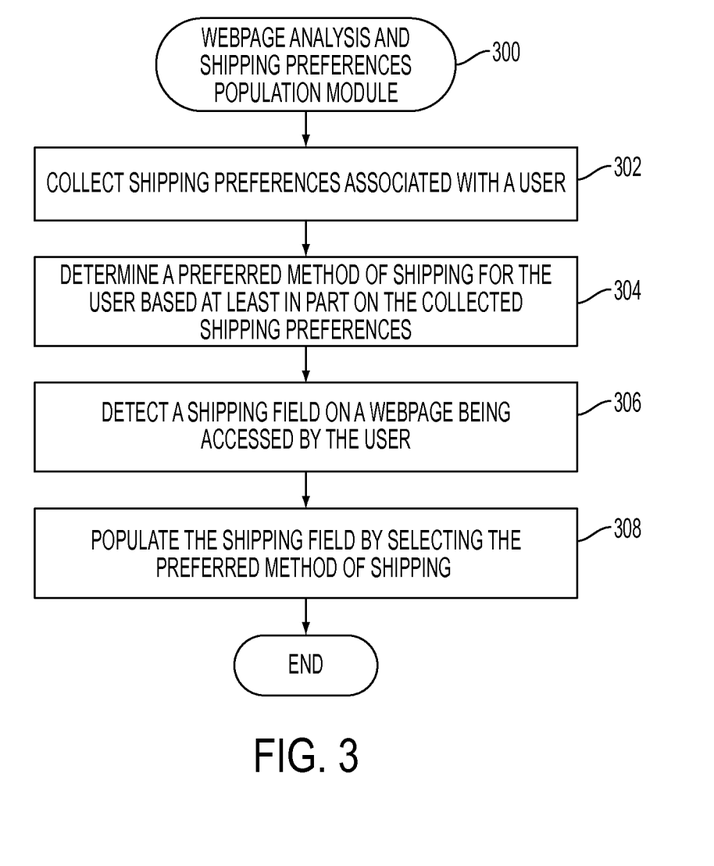
FIG. 3 shows a flow diagram that generally illustrates various steps executed by the exemplary Webpage Analysis and Shipping Preferences Population Module in FIG. 2 in accordance with various embodiments of the system of FIG. 1.

As shown in FIG. 3, certain embodiments of the Webpage Analysis and Shipping Preferences Population Module 300 are configured to gather consumer data and substantially automatically (e.g., automatically) fill-in user shipping preferences on a webpage. The Webpage Analysis and Shipping Preferences Population Module 300 may operate alone or in combination with the Operating System 80 to perform the functions shown in FIG. 3. It should be understood by one skilled in the art that certain embodiments of the Webpage Analysis and Shipping Preferences Population Module 300 may perform the functions shown in FIG. 3 in an order other than the order shown in FIG. 3. It should also be understood that various systems, when executing the Webpage Analysis and Shipping Preferences Population Module 300, may omit particular functions or execute additional functions in performing the functions of the Webpage Analysis and Shipping Preferences Population Module 300.

Exemplary Embodiment of the Webpage Analysis and Shipping Preferences Population Module Shown in FIG. 3

At Step 302, the system collects one or more shipping preferences associated with a user. The shipping preferences may include, for example: 1) one or more preferred methods of shipping associated with the user (e.g., Two Day Shipping, Next Day Air, Standard Shipping, etc.); 2) the one or more shipping addresses associated with the user (e.g., where a user has parcels delivered); 3) payment information associated with the user (e.g., credit card information and/or billing address associated with the user); 4) a preferred shipping price associated with the user (e.g., the user prefers "free" shipping, regardless of the time it takes to deliver a package); 5) custom delivery information associated with the user (e.g., special delivery instructions such as "Leave Parcel Behind Gate"), and/or 6) one or more alternative delivery location preferences specified by the user (e.g., the user may request to have parcels delivered to a nearby retail store rather than their residence or usual shipping address).

The system may be configured to collect the one or more shipping preferences via any suitable mechanism. In various embodiments, the system is configured to collect the one or more shipping preferences via a browser add-on/plug-in. In a particular embodiment, the system may be configured to, for example, detect when the user (or another suitable entity) is completing an online checkout process on a website associated with an online retailer using a browser add-on/plug-in. In this (and other) embodiment(s), the system may collect any suitable one or more shipping preferences including, for example, when the user selects a shipping method (e.g., Next Day Air) and/or fills in an alternate delivery address (e.g., the system collects the alternate delivery address, such as "1111 HERENOW LN").

In various embodiments, the system is configured to collect the one or more shipping preferences of the user via another suitable mechanism, such as an application programming interface (API), a server, and/or a web service associated with an account associated with the user. In some related embodiments, for example, the system is configured to collect the one or more shipping preferences by user input into a web form or pop-up window (e.g., the user indicates that he or she prefers Next Day Air on a web form associated with, or accessible to, the computer system). In further embodiments, the system is configured to collect the one or more shipping preferences by importing the one or more shipping preferences from a remote computer (e.g., the system imports the one or more shipping preferences associated with user from a remote computer, such one or more servers associated with one or more online retailers, which has collected shipping preferences associated with the user).

In another related embodiment, the system is configured to collect the shipping preferences via a web form associated with an account associated with the user. In this embodiment, the system is configured to enable the user to access an account (e.g., by logging in) and to fill out (e.g., indicate) their preferences on the web form. In this example, the system is configured to then save the shipping preferences entered (e.g., selected) by the user on the web form.

The account in the above example may be associated with any suitable entity. In a particular embodiment, the account is associated with a logistics company (e.g., a UPS MyChoice® account). In another embodiment, the account is associated with a particular online retailer (e.g., an account on Amazon®). In further embodiments, the account is associated with a social network (e.g., a Facebook® account associated with the user).

According to various embodiments, the system is configured to save the one or more user shipping preferences. The system may be configured to save the one or more user shipping preferences by, for example, sending the one or more user shipping preferences to be stored on a remote computer. In a particular embodiment, the system is configured to send the one or more shipping preferences to a server associated with a logistics company (e.g., the Logistics Server 25). In further embodiments, the system is configured to send the one or more shipping preferences to be stored locally (e.g., on a client device associated with the user). In still further embodiments, the system is configured to send the one or more shipping preferences to be stored on a third-party server (e.g., the one or more Third Party Servers 35).

The system continues, at Step 304, by determining a preferred method of shipping for the user based at least in part on the collected shipping preferences. In particular embodiments, the system is configured to determine the preferred method of shipping based at least in part on how often the user selects one or more particular shipping preferences as described in Step 302. In a particular example, the system is configured to collect a predetermined number of shipping preferences (as described above). Continuing with this example, after the system has collected the predetermined number of shipping preferences, the system is configured to, in various embodiments, determine which shipping preferences the user chooses most frequently (e.g., after collecting five shipping preferences, the system determines that the user selects Next Day Air majority of the time).

In various embodiments, the system may be configured to further determine a plurality of preferred shipping methods associated with a each of a variety of different types of items that the user orders. According to a particular example, the user may have a preferred shipping option for particular item types (e.g., perishable items) that differs from the user's preferred shipping option for other items types (e.g., such as clothing).

In further embodiments, the system may be configured to determine preferred methods of shipping that are different for different online retailers from which the user may order items. In a particular example, the system may be configured to determine that the user prefers "Next Day Air" shipping for a first online retailer, but "Standard Shipping" for a second online retailer.

In various embodiments, the system may be configured to determine a preferred method of shipping based on a price that the user typically pays for shipping. For example, if the user typically selects a shipping option that is around about eight dollars (e.g., regardless of the shipping method associated with such an option), the system may determine a preferred method of shipping that includes a preference for a shipping option that is within a particular tolerance of eight dollars (e.g., between seven and nine dollars).

In various embodiments, the system is configured to rank the user's one or more preferred shipping preferences and to select the top-ranked shipping method available on a particular website. As a particular example, the system may be configured to determine that the user prefers (in order): 1) next day air shipping; 2) second day air, and 3) three day shipping. In this example, if a website does not offer next day air shipping, the system may select the next choice that the user prefers that is available (e.g., second day air).

Continuing at Step 306, the Webpage Analysis and Shipping Preferences Population Module 300 detects a shipping field on a webpage accessed by the user (the shipping field may or may not be substantially similar to the one or more shipping fields in Step 302 wherein the system collects the one or more shipping preferences). The system may be configured to detect the shipping field in any suitable way. In various embodiments, the system is configured to detect the shipping field by analyzing the data of the webpage to find the shipping field (e.g., parsing the webpage). In a particular embodiment, the system is configured to detect the shipping field by scanning the web page for fields that meet pre-programmed criteria for a shipping field (e.g., the system scans the webpage for fields with specific associated text, such as, for example, "Shipping Address"). In further embodiments, the system is configured to detect the shipping field in response to the user indicating the shipping field is present on the webpage (e.g., the user uses a pointer device or other mechanism to indicate that a particular field is a shipping field).

The shipping field may include any type of field associated with choosing shipping methods when checking-out on an online retailer website. According to various embodiments, the shipping field is a user-selectable indicium associated with a particular method of shipping (e.g., a radio button associated with standard shipping, next day air, etc.). In some embodiments, the shipping field is for indicating (e.g., via a user-selectable indicium or other mechanism) the preferred logistics company (e.g., UPS®) to deliver the parcel containing the user's purchase. In further embodiments, the shipping field is intended for indicating one or more shipping addresses (e.g., a field wherein a user may fill in or select a saved a shipping address). In still further embodiments, the shipping field includes a field for inputting custom delivery instructions (e.g., "Leave the parcel behind the gate at the side of my house"), and/or a field for an alternate delivery location (e.g., where the user wants parcels to be dropped off if they are not home).

In a preferred embodiment, the webpage is associated with any online retailer; however, the webpage may be any suitable webpage that accepts shipping methods. In various embodiments, the webpage is associated with an online service, such as a website that is configured to aggregate flight search results (e.g., the system selects preferred flight options and/or fills in the user's shipping address).

At Step 308, the system populates the shipping field by selecting the preferred method of shipping. The shipping field may be any one or more suitable fields. The shipping field may be, according to particular embodiments, one or more fields for a user to input, for example, a shipping address. In various embodiments, the shipping field may be a user-selectable indicium, wherein the user may select one or more shipping options. In a particular embodiment, the one or more shipping options include: 1) standard shipping (e.g., 3-5 business day shipping); 2) two-day shipping; 3) overnight shipping; and/or 4) next day air shipping.

In various embodiments, the system is configured to populate the shipping field by selecting a radio button indicating the shipping method (e.g., the system substantially automatically selects a radio button associated with Next Day Air shipping on the webpage). In particular embodiments, where the shipping field is a field for an address, the system populates the shipping field by filling in a shipping address associated with the user (e.g., "1111 HERENOW LN"). In still other embodiments, the system populates the shipping field by selecting a link associated with a certain shipping option or logistics company (e.g., UPS® Ground).

In various embodiments, the system is configured to enable a user to modify the selected preferred method of shipping after the system has populated the shipping field. In particular embodiments, the system may be configured to enable the user to confirm the selected preferred method of shipping before completing the order, for example, on the website associated with the online retailer. In various embodiments, the system is further configured to complete the order and facilitate shipment of the items associated with the order to the user via the preferred method of shipping.

Alternate Embodiments

Alternative embodiments of the system may comprise features that are, in some respects, similar to the various components described above. Selected distinguishing features of these alternative embodiments are discussed below.

A Computer System Associated with an Online Retailer May Populate the Shipping Field(s)

In a particular example, the system may be configured to: 1) collect shipping preferences associated with a user; 2) determine a preferred method of shipping for the user based at least in part on the collected shipping preferences; and 3) transmit the preferred method of shipping to a computer system associated with an online retailer (e.g., using a suitable API). In this example, the system (e.g., through the API) substantially automatically (e.g., automatically) populates a shipping field on the on-line retailer's web site with the preferred method of shipping (as discussed above) of the user when the user is completing an online purchase (e.g., when the user is checking out or completing an order). In various embodiments, the retailer's computer system is adapted to auto-populate the shipping field for every on-line order placed by the user.

The System May be Configured to Collect and/or Populate Shipping Preferences in any Suitable Context Moreover, the system described above or similar systems may be used in any suitable context, such as on a website associated with an entity other than a website associated with an online retailer. In various embodiments, the system may be configured to populate shipping preferences associated with a user on any website or electronic form. In many embodiments, the system may be configured to fill in the information associated with one or more credit cards associated with the user. In a particular example, the system is configured to fill-in and/or select the preferred shipping preferences of a user on a web form for getting directions (e.g., the system fills in the user's address so the user can get turn-by-turn or other suitable directions to or from the filled in address).

The System May be Configured to Receive Notification that a User has Indicated a Shipping Field The system may be configured to detect a shipping field on a website in any suitable way, including by receiving notification that a user has indicated a shipping field on a webpage. In various embodiments, the system is configured to detect a shipping field by the user indicating a shipping field via a pointer device (e.g., the user clicks on or rolls-over a shipping field with a pointer-device, such as a mouse, indicating a shipping field). In a particular embodiment, the system is configured to receive notification that a user has selected a user-selectable indicium associated with the system via a web browser add-on, while a webpage is displayed (e.g., a webpage with a shipping field). Continuing with this embodiment, the system is configured to, at least partially in response to the user selecting the user-selectable indicium, scan the webpage to detect one or more shipping fields displayed on the webpage. At least partially in response to the system detecting the one or more shipping fields, the system is configured to populate the one or more shipping fields with the preferred method of shipping associated with the user (as described in Step 308).

The System May be Configured to Highlight the Preferred Shipping Method

The system may be configured to highlight the preferred shipping method (e.g., at Step 308 instead of or addition to "selecting" the preferred shipping method) in any suitable way. In various embodiments, the system is configured to highlight the preferred shipping method by changing the font of the text associated with the preferred shipping method. In further embodiments, the system is configured to highlight the preferred shipping method by changing the color of the background webpage around the text associated with the preferred shipping method (e.g., the system places a color-filled box around the text associated with the preferred shipping method). In still further embodiments, the system is configured to highlight the preferred shipping method by changing the font of the text associated with the preferred shipping method by, for example, making the text bold, italicized, or another font than other text (all or some) displayed on the webpage.

CONCLUSION

Many modifications and other embodiments of the present systems and methods will come to mind to one skilled in the art having the benefit of the teachings presented in the foregoing descriptions and associated drawings. Therefore, it is to be understood that the present systems and methods are not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computer system comprising:
   at least one processor, wherein said computer system is configured for:
   collecting, by a web browser plugin or an application programming interface configured to identify at least one shipping field from a set of retailer websites, one or more shipping preferences associated with a user, wherein the one or more shipping preferences comprise a plurality of inputs associated with at least one input shipping field;
   determining, by the web browser plugin or the application programming interface, which of the one or more shipping preferences are frequently selected by the user;
   identifying, by the web browser plugin or the application programming interface, a shipping item associated with a webpage;
   determining, by the web browser plugin or the application programming interface, at least one attribute associated with the shipping item;
   based at least in part on the one or more shipping preferences frequently selected by the user and at least one attribute associated with the shipping item, determining a preferred method of shipping for said user to ship the shipping item;
   detecting, by the web browser plugin or the application programming interface, one or more shipping fields on a webpage accessed by said user; and
   populating, by the web browser plugin or the application programming interface, said one or more shipping fields with said preferred method of shipping.

2. The computer system of claim 1, wherein said collecting said one or more shipping preferences comprises collecting the plurality of inputs associated with the at least one input shipping field from a plurality of retailer websites.

3. The computer system of claim 2, wherein said user designates the one or more shipping preferences on a web form on a retailer website.

4. The computer system of claim 2, wherein said user designates the one or more shipping preferences on a web form associated with an account associated with the user.

5. The computer system of claim 1, wherein said one or more shipping fields comprises one or more shipping options.

6. The computer system of claim 5, wherein said one or more shipping options comprises said preferred method of shipping.

7. The computer system of claim 1, wherein the one or more shipping options comprise:
(A) standard shipping;
(B) two-day shipping;
(C) overnight shipping; and
(D) next day air shipping.

8. The computer system of claim 7, wherein each of the one or more shipping options is associated with a respective radio button and wherein populating said one or more shipping fields comprises selecting said respective radio button.

9. The computer system of claim 1, wherein collecting said shipping preferences comprises collecting at least one of the plurality of inputs from a user input to a web form.

10. The computer system of claim 1, wherein said computer system is further configured for:
detecting an online checkout process on a website associated with an online retailer using a browser add-on or plug-in, and wherein collecting said shipping preferences comprises collecting the plurality of inputs via the browser add-on or plug-in.

11. The computer system of claim 1, wherein:
determining the preferred method of shipping comprises determining, at least partially based on the collected predetermined number of inputs, the most frequent input by the user associated with each one or more input shipping field.

12. The computer system of claim 1, wherein said inputs associated with said one or more input shipping fields:
(A) shipping method selection inputs;
(B) shipping address inputs;
(C) custom delivery inputs;
(D) alternate delivery location inputs;
(E) shipping price selection inputs; and
(F) common carrier selection inputs.

13. The computer system of claim 1, wherein the at least one attribute of the shipping item is a type of product or service, and wherein determining the preferred method of shipping comprises determining a preferred shipping method associated with the type of product or service.

14. The computer system of claim 1, wherein the at least one attribute of the shipping item is a retailer associated with the shipping item, and wherein determining the preferred method of shipping comprises determining a preferred shipping method associated with the retailer.

15. The computer system of claim 1, wherein determining the preferred method of shipping is based on a price that the user typically pays for shipping.

16. The computer system of claim 1, wherein determining the preferred method of shipping further comprises generating a ranking list of a plurality of shipping methods preferred by the user based on the plurality of inputs, and wherein populating said one or more shipping fields further comprises selecting a shipping method from the ranking list.

17. The computer system of claim 16, wherein selecting the shipping method from the ranking list is based on an order of the ranking list and availability of the shipping method on the webpage.

18. A computer-implemented method, the method comprising:
at least one processor, wherein said computer system is configured for:
detecting, through a web browser plugin or an application programming interface, a first shipping options set displayed on a first retailer website, wherein the first shipping options set comprises one or more selectable first shipping options;
determining a rank of the one or more selectable first shipping options preferred by a user based on respective frequencies of the one or more selectable first shipping options selected by the user;
storing said rank of the one or more selectable first shipping options preferred by the user in memory;
detecting, through the web browser plugin or the application programming interface, a second shipping options set on a second retailer website, wherein the second shipping options set comprises one or more selectable second shipping options; and
selecting, by the web browser plugin or the application programming interface, at least partially based on the determined rank of the one or more selectable first shipping options preferred by the user, one of the one or more selectable second shipping options.

19. The computer-implemented method of claim 18, wherein said one or more selectable first shipping options comprise a:
(A) one or more standard shipping options; and
(B) one or more express shipping options.

20. The computer-implemented method of claim 18, wherein selecting the one of said one or more selectable second shipping options comprises selecting one or more radio buttons associated with one or more second shipping options that are substantially similar to the stored one or more selectable first shipping options.

21. The computer-implemented method of claim 20, wherein said one or more selectable second shipping options comprise a:
(A) a standard shipping option;
(B) a two-day shipping option;
(C) a overnight shipping option; and
(D) a next day air shipping option.

22. The computer-implemented method of claim 20, wherein said one or more selectable second shipping options comprise one or more shipping products offered by a logistics company.

23. The computer-implemented method of claim 18, wherein the first retailer website and the second retailer website are a same online retailer.

24. A computer system comprising:
at least one processor, wherein said computer system is configured for:
detecting, through a web browser plugin or an application programming interface, a plurality of sets of shipping options displayed to a user on a plurality of websites, wherein the plurality of sets of shipping options comprise a plurality of selectable shipping preferences;
collecting, through the web browser plugin or the application programming interface, a predetermined number of the plurality of selectable shipping preferences selected by the user;
accessing, through the web browser plugin or the application programming interface, an attribute of a shipping item associated with a webpage;
determining a frequently selected method of shipping associated with the attribute of the shipping item from the predetermined number of the plurality of selectable shipping preferences as a preferred method of shipping for the shipping item for the user;

detecting, through the web browser plugin or the application programming interface, a set of shipping options on the webpage; and automatically, by the web browser plugin or the application programming interface, selecting a shipping option from the set of shipping options on the webpage based on the preferred method of shipping for the shipping item.

25. The computer system of claim 24, wherein the computer system is further configured for:

ranking a plurality of shipping methods preferred by the user based on the predetermined number of the plurality of selectable shipping preferences, wherein automatically selecting the shipping option from the set of shipping options comprises determining, from the plurality of shipping methods preferred by the user, a highest-ranked shipping method that is available from the set of shipping options, and selecting the highest-ranked shipping method from the set of shipping options.

26. The computer system of claim 25, wherein detecting the particular set of shipping options comprise scanning the particular retailer website.

27. The computer system of claim 25, wherein the one or more particular selectable shipping preferences comprise:

(A) a standard shipping option; and (B) an express shipping option.

\* \* \* \* \*

UNITED STATES PATENT AND TRADEMARK OFFICE
CERTIFICATE OF CORRECTION

PATENT NO. : 9,953,286 B2
APPLICATION NO. : 14/195418
DATED : April 24, 2018
INVENTOR(S) : Bala Ganesh et al.

Page 1 of 1

It is certified that error appears in the above-identified patent and that said Letters Patent is hereby corrected as shown below:

In the Claims

Column 12, Line 38: Please remove "a".
Column 12, Line 41: Please remove "a" and replace with --an--.

Signed and Sealed this
Twenty-sixth Day of June, 2018

Andrei Iancu
*Director of the United States Patent and Trademark Office*